E. H. TAYLOR, DEC'D.
G. A. TAYLOR, ADMINISTRATOR.
LABEL APPLYING MACHINE.
APPLICATION FILED APR. 18, 1917.

1,362,200.

Patented Dec. 14, 1920.
6 SHEETS—SHEET 1.

Inventor:
Eugene H. Taylor
by Macleod, Calver, Copeland & Dike
Att'ys

E. H. TAYLOR, DEC'D.
G. A. TAYLOR, ADMINISTRATOR.
LABEL APPLYING MACHINE.
APPLICATION FILED APR. 18, 1917.

1,362,200.

Patented Dec. 14, 1920.
6 SHEETS—SHEET 2.

Inventor:
Eugene H. Taylor
By Macleod, Calver, Copeland & Dike
Att'ys

E. H. TAYLOR, DEC'D.
G. A. TAYLOR, ADMINISTRATOR.
LABEL APPLYING MACHINE.
APPLICATION FILED APR. 18, 1917.
1,362,200.
Patented Dec. 14, 1920.
6 SHEETS—SHEET 3.
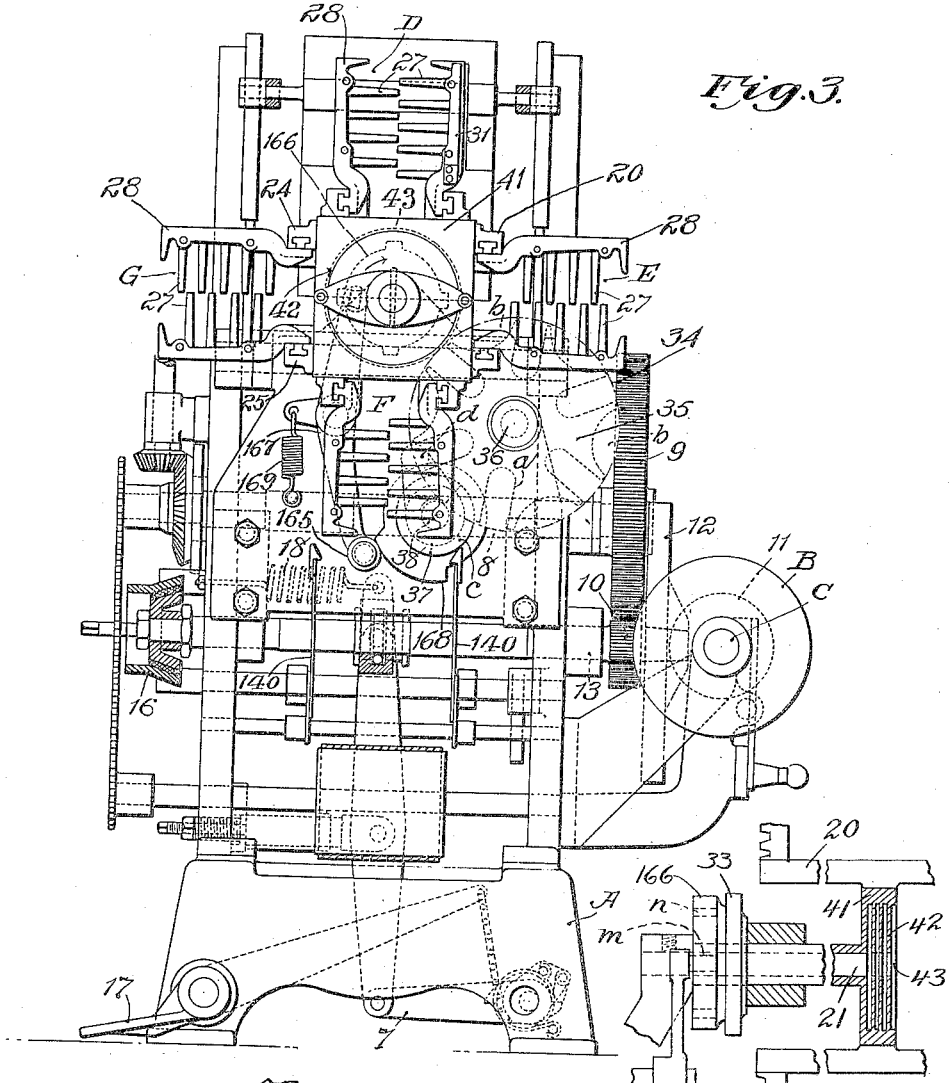
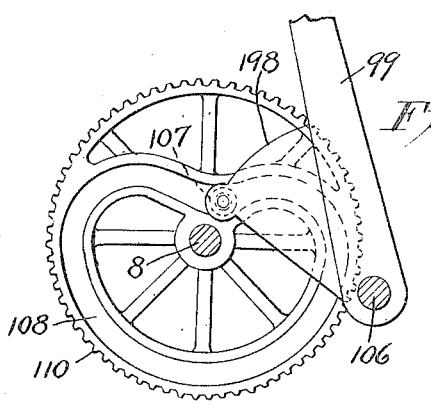
Inventor
Eugene H. Taylor
by Macleod, Calver, Copeland & Dike
Attys

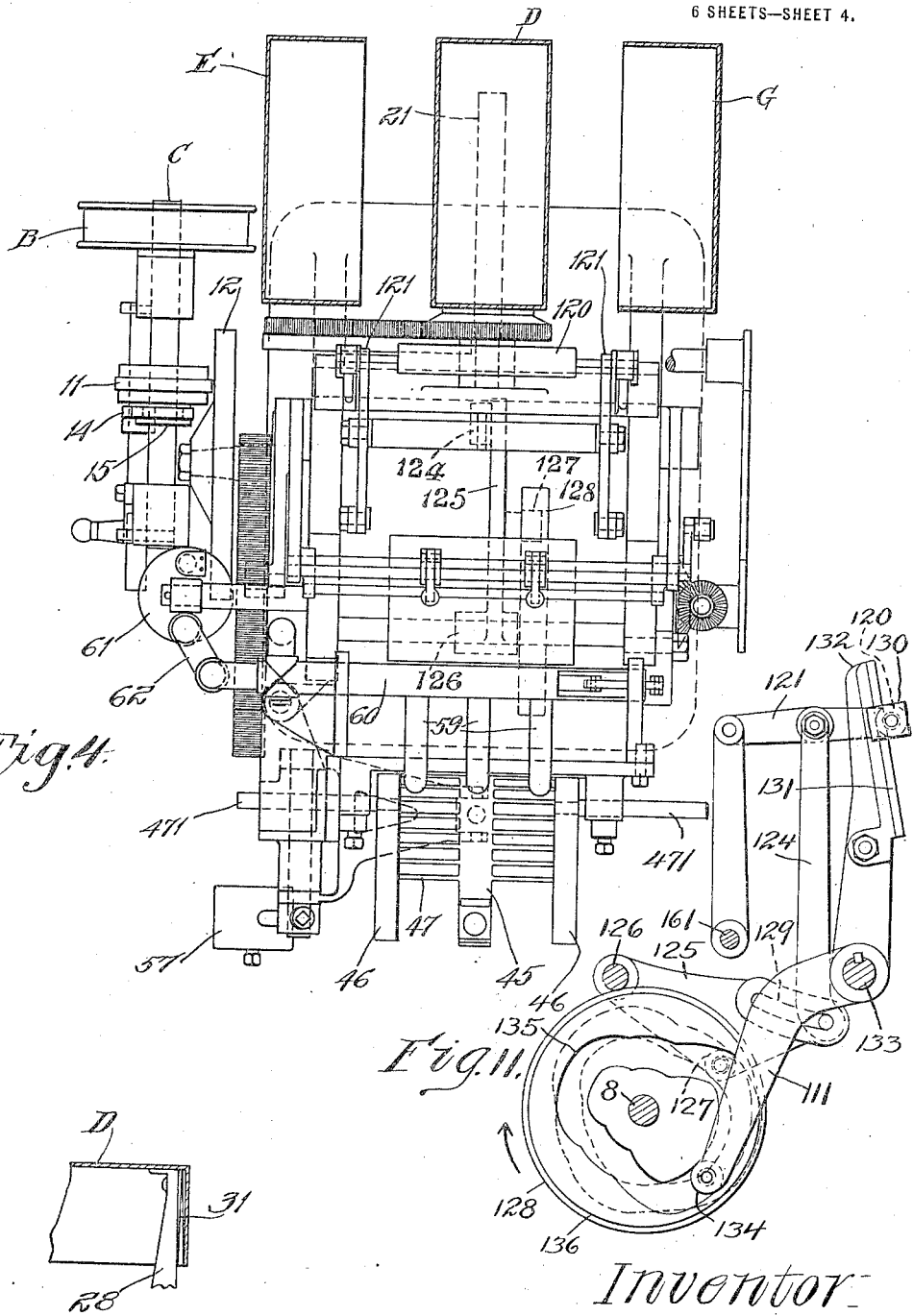

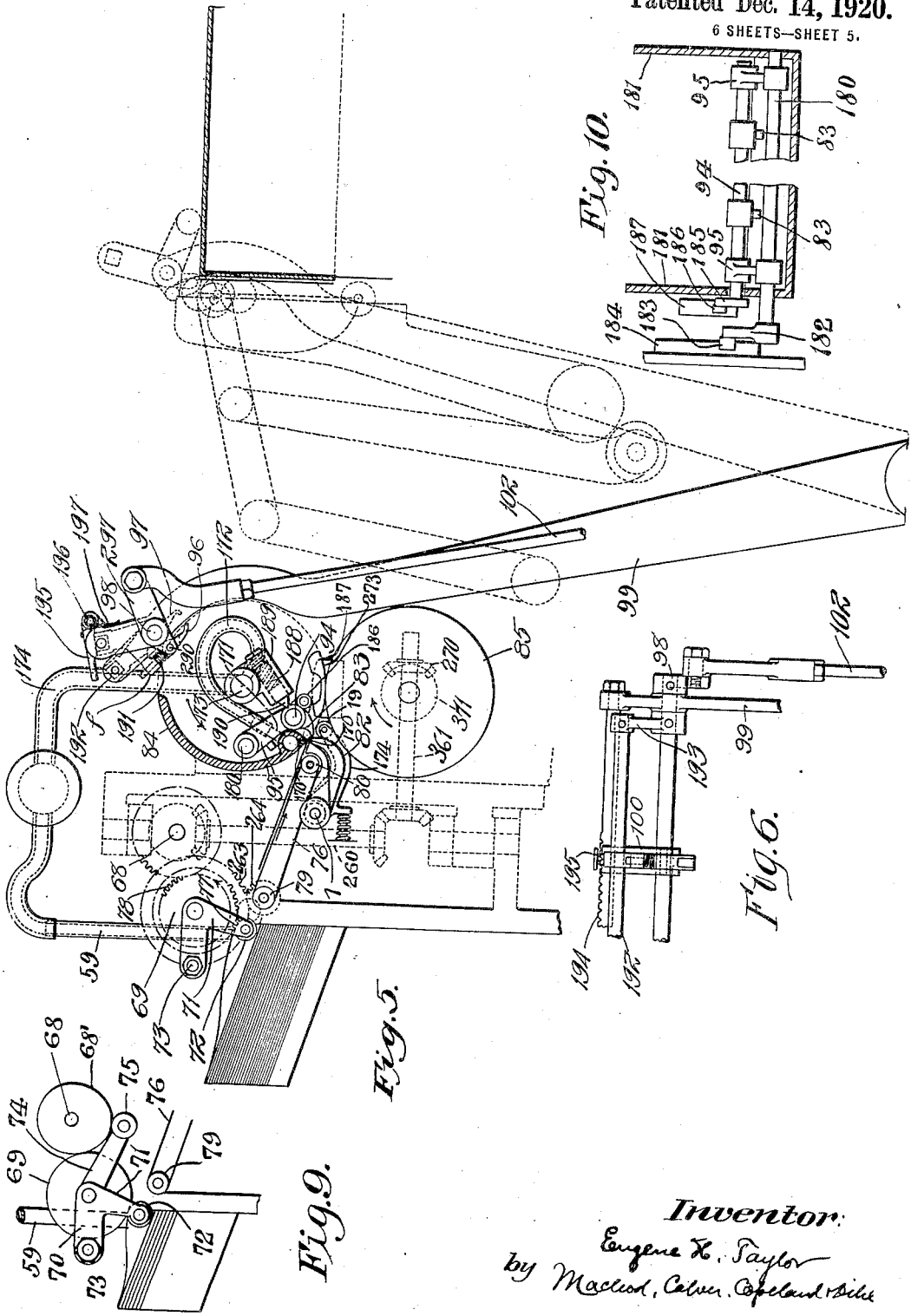

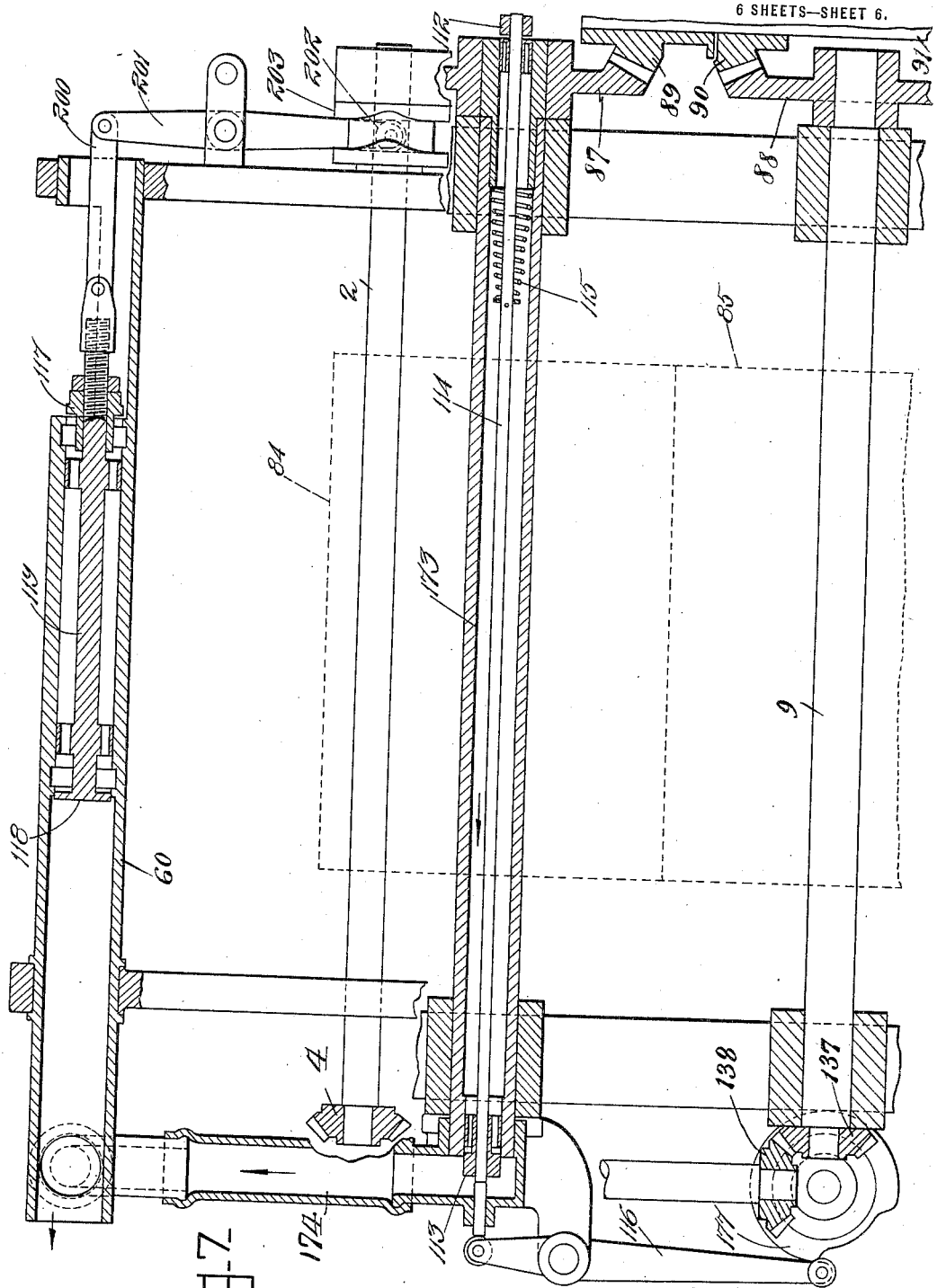

UNITED STATES PATENT OFFICE.

EUGENE H. TAYLOR, OF BOSTON, MASSACHUSETTS; GEORGE A. TAYLOR, ADMINISTRATOR OF SAID EUGENE H. TAYLOR, DECEASED, ASSIGNOR, BY MESNE ASSIGNMENTS, TO JOHN T. ROBINSON COMPANY, OF BOSTON, MASSACHUSETTS, A CORPORATION OF MASSACHUSETTS.

LABEL-APPLYING MACHINE.

1,362,200. Specification of Letters Patent. Patented Dec. 14, 1920.

Application filed April 18, 1917. Serial No. 162,898.

*To all whom it may concern:*

Be it known that I, EUGENE H. TAYLOR, a citizen of the United States, residing at Boston, county of Suffolk, State of Massachusetts, have invented a certain new and useful Improvement in Label-Applying Machines, of which the following is a specification, reference being had therein to the accompanying drawings.

My invention has for its object a machine for applying labels, particularly end labels to set-up boxes, such as shoe boxes, shirt boxes, collar boxes, and the like.

While I have shown and described the invention as adapted for operation on paper boxes it will be understood that it may be employed to apply labels to metallic boxes, or in fact any rectangular shaped box. In the machine shown in the accompanying drawings, the labels are placed in a floating hopper or reservoir, glue or paste is put in a glue or paste pan, and the boxes are placed by the operator one by one on a former. The machine takes the top label from the pile, applies the adhesive, positions the label on the box, rolls it down and deposits the finished box on a carrier.

The invention will be fully understood from the following description taken in connection with the accompanying drawings, and the novel features thereof are clearly pointed out and distinctly defined in the claims at the end of this specification.

In the drawings, Figure 1 is a side elevation of a machine embodying my invention, certain parts being in section for convenience of illustration.

Fig. 3 is a rear elevation.

Fig. 4 is a top plan view.

Figs. 5 and 6 are detail views of the transfer mechanism, grippers and actuating mechanism in the glue bed roll.

Fig. 7 is a detail view of the air valve mechanism.

Fig. 8 is a detail view of the box holder showing the spring.

Fig. 9 is a detail of the transfer mechanism by which a label is carried from the reservoir to the glue applying mechanism.

Fig. 10 is a detail of the operating mechanism for the grippers on the glue bed roll.

Fig. 11 is a detail of the label applying mechanism.

Fig. 12 is a detail of the transfer mechanism by which a label is carried from the glue applying mechanism to the box to which it is to be applied.

Fig. 14 is a detail view of the friction brake for the box form frame.

Figure 1:
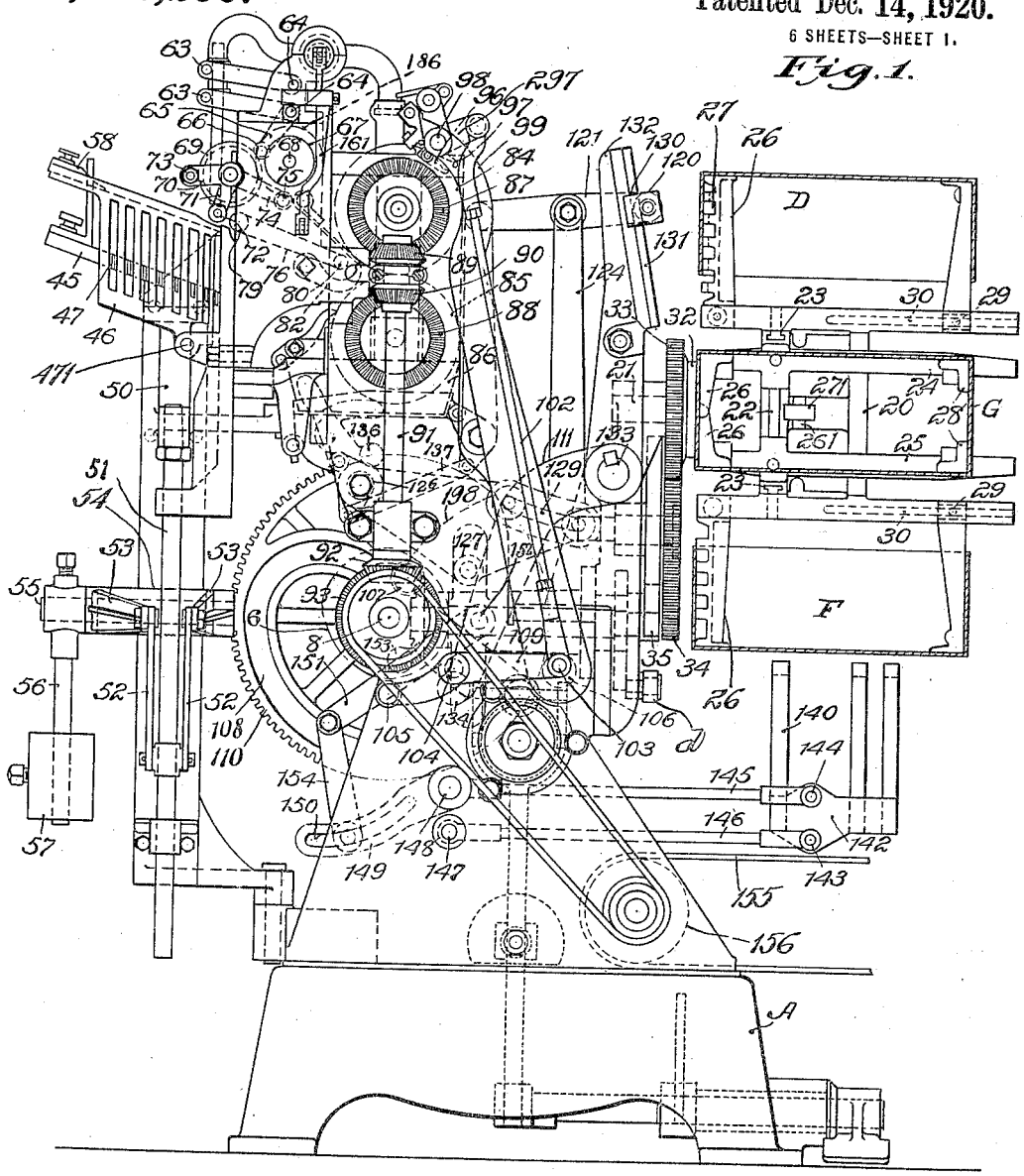

In the following description the face of the machine where the label reservoir is located will be considered as the front of the machine. The operator stands at the side of the machine, his only duty being to feed the machine with boxes. The machine will be considered as composed of several groups of instrumentalities which will be described separately and as far as possible in order.

The machine is supported on a suitable frame A and is operated by a belt (not shown) applied to a main pulley B. This pulley is on the end of the friction drive shaft C. The machine is driven by two friction disks 11 and 12, one of which 11 is moved to vary the speed of the machine, and the other of which 12 is moved into or out of contact with the disk 11 to start or stop the machine. The disk 11 is mounted on the friction drive shaft C and is moved by means of a fork 14 engaging a suitable collar 15 on the hub of the disk 11. The other friction disk 12 is mounted on the end of the driving shaft 13, said shaft being slidable longitudinally a distance sufficient to allow the disk 12 to move out of contact with the disk 11 when the operator stops the machine. On the other end of the driving shaft 13 is a friction brake 16 located so that it will act just when the friction disk 12 moves off the disk 11. The driving shaft 13 is shifted longitudinally by a treadle 17 acting through connections 7. A spring 18 serves to move the various parts in the direction opposite to the treadle. As the machine is geared to the driving shaft as will be explained, the machine is instantly stopped if the treadle is suddenly released.

The adjustable traveling box forms will now be described. At 20 is shown the box form frame mounted on a stationary shaft 21, secured to the frame of the machine. The box form frame 20 is rotatable on the shaft and carries and supports four adjustable box form D, E, F, and G, which are all identical in construction. The box form frame 20 is provided with T-slots 22 which extend around its four sides, the said slots being open at the ends to permit the introduction of necessary T-bolts 23 by means of which the members composing the box forms are adjustably secured to the box form frame. Each box form includes two bars 24 and 25 secured to one of the T-slots 22 by T-bolts 23. These bars are adjustable toward and away from each other by a right and left hand screw 261, provided with a centering disk 271 engaging a notch in the frame 20. The two bars 24 and 25 are each provided with a front corner member 26, each of which has a series of fingers 27, see Fig. 3, so arranged that when the corner members 26 are brought close together the fingers 27 on one corner member will be located in the spaces between the fingers on the other corner member. The fingers all together form a backing to support the entire area of the end of the box to which the label is to be applied so that pressure can be applied to the entire label without injuring the box. The two rear corner members 28 are adjustable lengthwise, being secured by T-bolts 29, the heads of which are located in a slot 30 in the bars 24 and 25 respectively. In this manner the box form is made adjustable for variations in length and width of the different boxes to be operated upon but the front face of the box form always remains in the same plane. To take care of the slight variation in size which occurs in practice between boxes of the same size and to hold the boxes on the forms so that they will not drop off before they are removed by the ejector, double leaf springs 31 are provided on the rear and one side of the box. These springs are supported at one end and have sufficient tension to insure the box being properly positioned on the box form without doing injury to the box itself. The box form frame 20 revolves to bring the four forms successively into the position occupied in the drawings by the form D, this being the position in which the label is applied.

Figure 2:
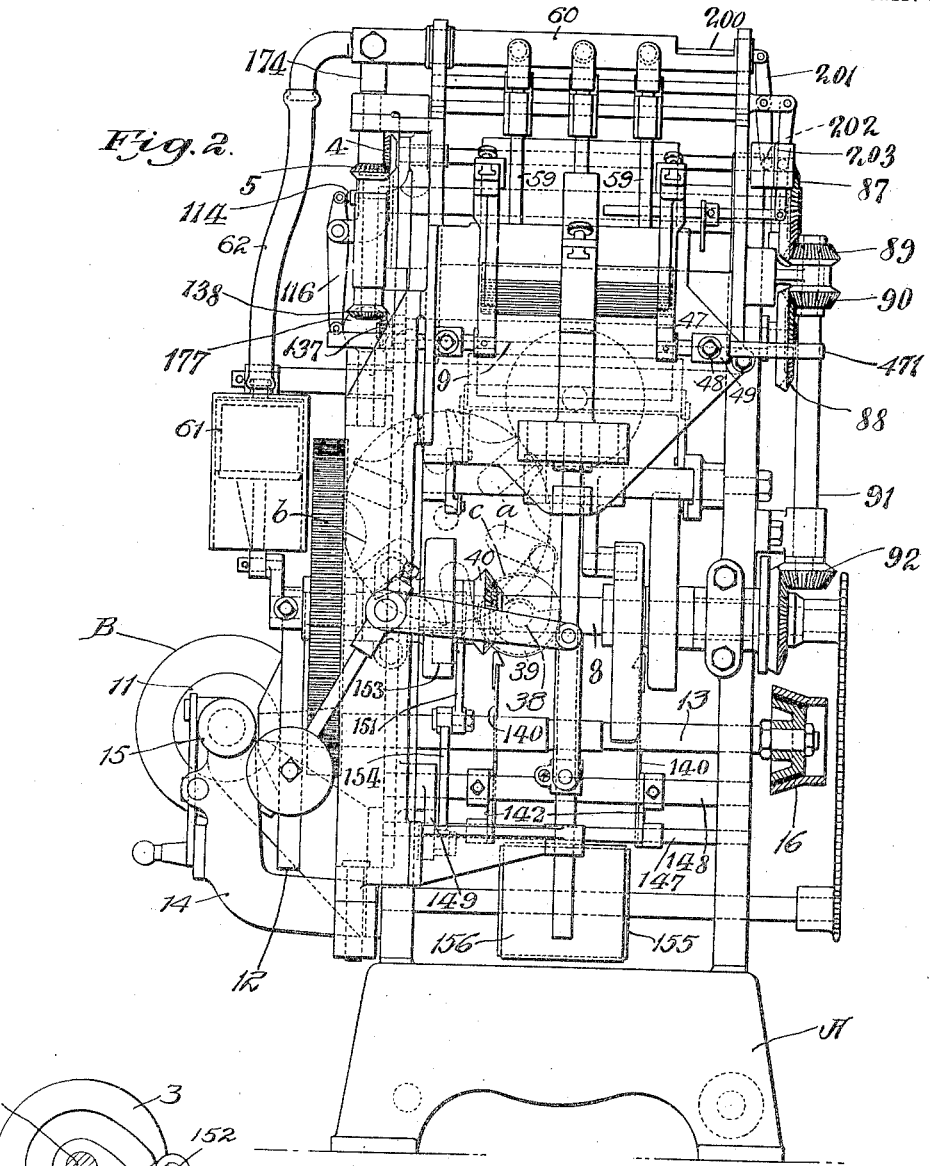
Fig. 2 is a front elevation of the machine shown in Fig. 1.
Figure 13:
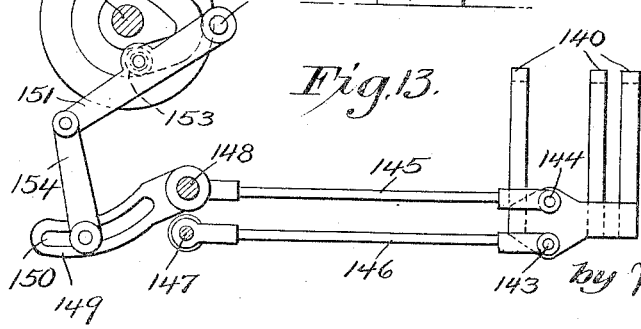
Fig. 13 is a detail of the ejector mechanism.

To give the four box forms and the frame 20 on which they are supported the requisite step-by-step rotation I provide the following mechanism— On the hub 32 of the frame 20 is a gear 33 which meshes with a gear 34 which carries one member 35 of Geneva movement. This gear and Geneva movement are pivoted at 36. The other member 37 of the Geneva movement is pivoted on a cross-shaft 38, having on its front end a beveled gear 39 meshing with a gear 40, see Fig. 2. This gear 40 is on the main shaft 8 driven as previously described. The female member of the Geneva movement is provided with a series of slots $a$, six in number, intermediate which are segmental indentations $b$ corresponding with the circumference of the segment $c$ on the male member of the Geneva movement. The slots $a$ coöperate with the roll $d$ on the male member. This mechanism is of well-known form and operates to give the box form frame a step-by-step movement, ninety degrees at each step, alternating with periods of rest during which the box form frame is locked in position by the segment $c$. The ratio of movement between the Geneva movement and the form carrier is three to two.

To prevent the box form frame 20 having a tendency to spin or go by its position, I provide a friction brake comprising a collar 41 on the box form frame carrying a series of disks 42 which coöperate with a series of disks 43 on the fixed shaft 21 upon which the box form frame is mounted. To hold the box form frame absolutely rigid as there will be a slight movement of lost motion between it and the Geneva movement, I provide a positive stop, comprising a notched annulus 166, a cam lever 167, a cam roll 165, and a cam 168, said cam being located on the shaft 38 on which the male member of the Geneva movement is mounted. The cam lever 167 is held in engagement with the cam 168 by a spring 169, and is provided at its upper end with a projection $m$ which enters one of the notches $n$ in the annulus 166 when the box form frame is in locked position. The cam moves the cam lever and unlocks the box form frame just before it is rotated by the Geneva movement and the spring 169 moves the cam lever 167 back again and locks the box form frame when the cam roll 165 rides off the projecting part of the cam 168 thereby locking the box form frame in place again.

The floating label reservoir will now be described. The labels are placed on a floating shelf 45 forming the bottom of the reservoir, the sides of which are formed by grate-shaped members 46, which are laterally adjustable for different sizes of labels, but do not move vertically. The floating shelf 45 is provided with bars 47 which project through the slots between the bars composing the grate-shaped sides 46 of the reservoir. This is to make it possible to move the sides of the reservoir laterally to adjust the sides of the reservoir forward and away from each other for different sizes of labels and still maintain a complete support for the bottom of the pile of labels. It also permits the vertical movement of the bottom or shelf of the reservoir relatively to the sides to maintain the top label of the pile always in the same position. The lateral adjustment of the sides 46 of the reservoir is accomplished by means of the rods 471 and set screws 48 in brackets 49 on the frame of the machine.

The floating shelf 45 is secured by means of a head 50 to the upper end of a slide composed in part of a rod 51 carried by two links 52. The links 52 are secured to the ends of two arms 53 fixed to a hub 54 which together with its arms forms a rocking lever. The hub 54 is on a stud shaft 55 and also carries an arm 56 on which is a weight or counterpoise 57, which, being adjustable lengthwise of the arm 56, exerts a force sufficient to hold the pile of labels yieldingly in the highest position permitted by a pair of stops 58 which engage the upper front corners of the pile of labels. This mechanism is such that the pile of labels is constantly raised as the labels are removed from the top by the label-feeding mechanism. The top label always occupies the same position with relation to the label-transferring mechanism.

The top label in the pile is lifted off the pile by means of one or more suction nozzles 59 connected to a header 60 through which suction is produced by the suction pump 61. The header 60 is connected with the pump by a flexible tube 62. The header 60 and attached suction nozzles 59 are movable vertically on a parallel motion composed of two bars 63 mounted on pivots 64 on the frame of the machine. One of the bars 63 composing the parallel motion is actuated by an arm 65 having on its lower end a cam roll 66 engaging a cam 67 on a cam shaft 68. The cam shaft 68 is driven by a vertical shaft 260 which is itself driven by a cross shaft 361 operated by gears 270 and 371, the latter of which is on the end of the shaft on which is mounted a glue roll which will be described hereafter.

The movement of the vacuum nozzles is relatively small. The nozzles move periodically down into contact with the upper surface of the top label and then upward again lifting the top label slightly away from the remainder of the pile.

The transfer mechanism by which the label is carried from the reservoir to the box form will now be described. It will be understood that the adhesive is applied to the label during its progress from the reservoir to the box-form. At 69 is shown a large picker roll which is constantly revolving, being geared to the cam shaft 68, already described. On each end of the picker roll 69 is a spider 70, one arm of which 71, supports the small movable picker roll 72. Another arm of the spider carries a spreader rod 73 across the front of the large picker roll. Another arm 74 of the spider carries a cam roll 75 which engages a cam 681 on the cam shaft 68. The parts are so timed that just after the top label has been lifted up by the vacuum nozzles as described the small picker roll 72 is oscillated backward about the axis of the large picker roll 69 by means of the cam 681, roll 75 and arm 74 so that the two picker rolls seize the end of the label between them. The small picker roll is positively driven from the large picker roll by a pair of intermeshing gears 77 and 78 so that the two rolls have the same peripheral speed.

The label is delivered by the picker rolls 69 and 72 on to a series of transfer belts 76 running about the pulleys 79 and 80. The pulley 79 is actuated by gears 263 and 264, the former of which is on the shaft on which the large picker roll is mounted.

The transfer belt carries the label rearwardly until its edge contacts with the movable stop 82. This stop 82 is actuated in proper time with the other parts of the machine by a cam 273 on a glue bed roll 84. The stop 82 is mounted on a rod 1 which has a lever arm 174 carrying a cam roll 19 which is in the path of the cam 273 on the end of the glue bed roll 84. When the cam comes around, its under face strikes the cam roll 19 and moves the lever 174 down just enough to release the label. When the label is against the stop 82 it is in position to be seized by the grippers 83 carried on the glue bed roll 84, coöperating with a glue roll 85 dipping in suitable adhesive in a pan 86. The glue rolls 84 and 85 are driven by bevel gears 87 and 88 respectively, meshing with gears 89 and 90 on a vertical shaft 91, which itself is driven by gears 92, 93 from the main shaft 8. The grippers 83 (see Figs. 5 and 10) are mounted on a rod 94 carried on two arms 95 fixed on a rod 180 carried in bearings on the ends 181 of the glue bed roll. The rod 180 has fixed to its outer end an arm 182 having on it a cam roll 183 which contacts with a stationary cam 184 on the frame of the machine. The rod 94 also has an arm 185 fixed to it and carrying a cam roll 186 which contacts with another stationary cam 187 on the frame of the machine. Spiral springs 188 in boxes 189 hold a pin 190 against arms 95 so the grippers are always held out as far as is permitted by the cam 184.

The label is carried around the glue bed roll by the grippers 83 until its upper edge is on the rear of the roll near the top. At this point it is seized on its upper edge by transfer grippers and transferred to a position adjacent the end of the box on the box form. This transfer mechanism will be clearly understood by reference to Figs. 1, 5 and 6, which show it in detail. The transfer grippers comprise yielding fixed grippers 96 and movable grippers 97 arranged in pairs. The grippers are supported on a rod 98 rotatably mounted in the upper ends of a pair of swinging transfer arms 99. Each pair of grippers is carried by a pair of brackets 100 (see Fig. 6). The fixed yielding gripper is pivoted at 290 and has a forked nose. A spring 191 resting against a lug $f$ permits a slight yielding movement to compensate for any variation in thickness of the labels. The tops of the movable grippers are connected by a square rod 192 which permits the grippers to slide longitudinally and which also actuates the grippers. The square rod 192 is carried in two arms 193 fixed on the shaft 98 so that when the shaft is oscillated the movable grippers are moved. At 194 is shown a notched rod carried in the upper ends of the transfer arms 99. The notches in this rod are engaged by a latch 195 hinged to the brackets 100 as shown at 196. The latch is held down by a spring 197. The latch keeps the pair of grippers with which it is associated in any position of adjustment lengthwise of the rod 194, in which it may be placed. The shaft 98 and attached parts including the movable grippers are actuated by a connecting rod 102 attached to the end of an arm 297 on the shaft 98.

The lower end of the connecting rod 102 engages a lever 109 pivoted at 104 carrying on its other end cam roll 105 operated by the cam 6 on the main shaft 8. The transfer arms 99 are mounted on an oscillating shaft 106 in the frame of the machine. Fixed to the rod 106 is an arm 198 which carries a cam roll 107 which engages a slot 108 in a cam 110 on the cam shaft. The pivot 103 connecting the lever 109 and the connecting rod 102 is practically coincident with the axis of oscillation of the transfer arms 99, so that the upper end of the transfer arms with the attached mechanism may be oscillated without interfering with the action of the grippers.

It will be understood that the transfer grippers take the label from the glue bed roll and carry it toward the right, as seen in Fig. 1, until it hangs adjacent the end of the box on top of box form D.

The label applying mechanism will now be described: The label applying mechanism includes a presser roll 120 which is movable toward and away from the label and also is movable vertically. The presser roll 120 is mounted on the ends of two horizontal arms 121. The vertical movement of the presser roll is given it by the forked link 124, the lower end of which is pivotally connected with the end of a cam lever 125 pivotally mounted at 126 to the frame of the machine. The cam lever carries a cam roll 127 which engages a cam 128 on the main shaft 8. The point of connection between the forked link 124 and the cam lever may be varied by means of an arc-shaped slot 129.

The horizontal arms 121 are provided with sliding members 130 which engage the guides 131 on the upper end of a pair of presser levers 132. The presser levers 132 are fulcrumed on a rock shaft 133. This shaft has fixed to it an arm 111 having at its lower end a cam roll 134 which engages a cam slot 135 in a cam 136 on the main shaft 8.

The parts are arranged and the cams are timed so that the presser roll 120 is at the bottom of its stroke when the label is being moved across by the transfer grippers. The presser roll 120 is then raised to a point about midway of the height of the label; then the presser-lever 132 moves the roll to the right and holds it against the label. Next the forked link 124 carries the roller down in contact with the label. Then the presser lever 132 moves the roller slightly away from the label and the roll 120 rises to about midway of the label. It is then moved again into contact with the label and then moves up to the upper end of the stroke, laying the upper half of the label onto the box. The transfer grippers release the label at about the beginning of the last mentioned upward movement and immediately return to their original position so that they are out of the way of the roll 120. Thereafter the roll 120 is moved away from the label, and then down to its starting point. This movement is such that the lower half of the label is first applied forcibly to the box and then the roller presses down the upper half of the label which has then adhered to the box sufficiently so that the roll can operate on it without disturbing its position.

After each label has been applied the box form frame rotates ninety degrees, bringing a box into the lowest position ready to be removed from the box form. This is accomplished by means of an ejector which will now be described. It consists of a plurality of spring ejector fingers 140 with beveled hook shaped ends, clearly seen in Fig. 2, which can engage the upper edge of the box on the form F. These fingers are carried on the heads 142 slidable on a pair of rods 143, 144, which are themselves carried on the ends of pairs of rods 145, 146, forming two parallel motions. The front ends of these rods are pivoted on rods shown at 147 and 148 respectively. The rod 148 has secured to it a fixed arm 149 in which is a slot 150. The arm 149 is moved by a cam lever 151 pivoted at 152 and operated by a cam roll 153 which is moved by a cam 3 mounted on shaft 8. The moving end of the cam lever 151 is connected by a link 154 to the arm 149 and the point of connection between the arm 154 and the arm 149 is adjustable by means of the slot 150 heretofore mentioned. It will be seen that this mechanism is such that the spring ejector fingers move up, their upper ends being maintained in a parallel position until the projections on the upper ends ride over the upper edge of the box. On the down stroke the box is pulled off the box form and drops onto the belt 155 running on pulley 156.

To permit the label to be carried past the glue roll 85 without the grippers 83 coming in contact with the glue roll, the following mechanism is provided. As has been previously stated, the grippers are released and thrown back out of the way by the operating cam just before they reach the point of contact between the glue bed roll and the glue roll so that they no longer support the label. To hold the label on the glue bed roll at this time, I perforate the periphery of the glue bed roll along the line coincident with the forward edge of the label. These perforations 170 are connected with a pipe 171 on the inside of the roll and this pipe is connected with a branch 172 which communicates with a hollow axle 173 for the bed roll. The hollow axle is itself connected by a pipe 174 with the vacuum pump 61 (see Fig. 2). The hollow axle is provided with two valves 112 and 113 by means of which the vacuum in the axle is controlled at proper intervals with relation to movements of the other parts of the machine. The valves 112 and 113 are mounted on a sliding valve rod 114. The rod is moved in one direction by a spring 115, and in the other direction by a cam lever 116 operated by a cam 177. These parts are arranged so that the label may be held against the glue bed roll by atmospheric pressure just at the time when the end of the label is passing between the glue roll and the glue bed roll. Immediately after this the gripper again seizes the label and the pressure is released.

The suction through the suction nozzles 59 is controlled by two valves 117 and 118 (see Fig. 7). These valves are on a rod 119 which is moved longitudinally by a link 200, connected at its end with a cam lever 201. The cam lever carries a cam roll 202, which engages a cam 203 by which the valves are positively moved in both directions. The cam 203 is mounted on the end of a shaft 2 which is rotated by bevel gears 4, 5 and 138, 137 the latter of which is carried by shaft 9 on which is mounted the glue roll 85 (see Figs. 2 and 7).

What I claim is:

1. In a machine of the character described, a label reservoir, a box form, a glue roll, and a glue bed roll intermediate said label reservoir, and said box form, transferring mechanism between said label reservoir and said gluing mechanism and between said gluing mechanism and said box form, and presser mechanism for applying the label to a box on the form.

2. In a machine of the character described, gluing mechanism including a glue bed roll, a box form, a presser roll movable in a plane parallel with the end of the box form, a pair of grippers to take the label from the glue bed roll and transfer it to a position adjacent the end of the box form, and means for moving said presser roll into contact with the label on the end of the box form, and for moving it vertically in a plane parallel with the end of the box form, the movement of said parts being timed so that the presser roll is out of the path of the label when the label is being transferred from the glue bed roll to a position adjacent the box form.

3. In a machine of the character described, and in combination with a glue bed roll, an oscillating transfer arm, grippers on the said transfer arm to seize the label, a box form, a presser roll adjacent one end of the box form, a presser lever to hold the presser roll against the box form, and mechanism for moving the presser roll vertically.

4. In a machine of the character described, the improved presser mechanism comprising a presser roll, a slide on which said presser roll is mounted, a lever carrying the said slide, actuating means to swing the said lever toward and away from the box form, a connecting rod moving the said presser roll lengthwise of the said slide whereby the presser roll is held against the label and is then moved across the face of the label to press the same against the box.

5. In a machine of the character described, transfer mechanism comprising an oscillating arm having grippers at the free end and mechanism for moving one of said grippers comprising a connecting rod, a cam lever and actuating means therefor, said parts being arranged in proportion so that the pivotal connection between the cam lever and the connecting rod will move in an arc one point of which coincides with the axis of oscillation of the transfer arm.

6. In a machine of the character described, and in combination with a box form, an ejector comprising a plurality of leaf springs provided at their upper ends with hooks and inclined near the ends, mechanism for moving the said hooks toward and away from the box form.

7. In a machine of the character described, an ejector comprising a spring hooked spring members, and a parallel motion device to move said spring members toward and away from a box on a box form.

In testimony whereof I affix my signature.

EUGENE H. TAYLOR.